(12) United States Patent
Iyoshi et al.

(10) Patent No.: US 9,783,239 B2
(45) Date of Patent: Oct. 10, 2017

(54) STRUCTURE FOR SIDE PART OF BODY OF VEHICLE

(71) Applicant: MAZDA MOTOR CORPORATION, Hiroshima (JP)

(72) Inventors: Akira Iyoshi, Hiroshima (JP); Shigeaki Watanabe, Hiroshima (JP); Keizo Kawasaki, Hiroshima (JP); Takahiro Kageyama, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 15/101,632

(22) PCT Filed: Dec. 4, 2014

(86) PCT No.: PCT/JP2014/082150
§ 371 (c)(1),
(2) Date: Jun. 3, 2016

(87) PCT Pub. No.: WO2015/087782
PCT Pub. Date: Jun. 18, 2015

(65) Prior Publication Data
US 2016/0311471 A1  Oct. 27, 2016

(30) Foreign Application Priority Data
Dec. 13, 2013  (JP) .................................. 2013-257914

(51) Int. Cl.
*B60J 7/00* (2006.01)
*B62D 25/02* (2006.01)
(Continued)

(52) U.S. Cl.
CPC ........... *B62D 25/025* (2013.01); *B62D 25/04* (2013.01); *B62D 25/2036* (2013.01)

(58) Field of Classification Search
CPC .... B62D 25/025; B62D 25/04; B61D 17/043; B61D 17/10; B61D 7/02; B61D 7/00;
(Continued)

(56) References Cited

U.S. PATENT DOCUMENTS 5,246,264 A * 9/1993 Yoshii .................. B62D 25/025
296/1.03
5,354,115 A * 10/1994 Esaki .................... B62D 25/025
296/187.12
(Continued)

FOREIGN PATENT DOCUMENTS

JP  2004-051095 A  2/2004
JP  2006-131125 A  5/2006
(Continued)

OTHER PUBLICATIONS

An Office Action issued by SIPO on Mar. 1, 2017, which corresponds to Chinese Patent Application No. 201480066882.X, with partial English language translation.
(Continued)

*Primary Examiner* — Kiran B Patel
(74) *Attorney, Agent, or Firm* — Studebaker & Brackett PC

(57) ABSTRACT

A vehicle body side part structure for a vehicle includes a side sill connected to the lower part of a pillar, and a partition member provided within the side sill. The partition member includes a partition wall for dividing a closed sectional space of the side sill in the vehicle front-rear direction, and joint flange joined to the inner surface of a side sill inner member. The partition wall includes a ridge extending from a side of the side sill outer reinforcement to a side of the side sill inner member and connected to the joint flange. A widening portion is formed at an end of on the ridge close to the joint flange. This configuration makes it possible to improve the
(Continued)

load transmission performance at the time of a side collision of the vehicle.

6 Claims, 7 Drawing Sheets

(51) Int. Cl.
 *B62D 25/04* (2006.01)
 *B62D 25/20* (2006.01)
(58) Field of Classification Search
 CPC .. E05B 13/005; E05B 15/102; E05B 17/0025; E05B 17/0041
 USPC .... 296/193.05, 146.6, 146.9, 187.12, 203.03
 See application file for complete search history.

(56) References Cited

U.S. PATENT DOCUMENTS

| | | | | |
|---|---|---|---|---|
| 5,443,297 A * | 8/1995 | Tanaka | ................... | B62D 25/02 296/203.03 |
| 6,409,257 B1 * | 6/2002 | Takashina | ............ | B62D 21/157 296/187.12 |
| 6,854,795 B2 * | 2/2005 | Yamazaki | ............ | B62D 21/157 296/187.12 |
| 7,264,302 B2 * | 9/2007 | Nagashima | .......... | B62D 21/157 296/187.12 |
| 7,614,683 B2 * | 11/2009 | Roccato | ............... | B62D 21/157 296/187.03 |
| 8,409,725 B2 * | 4/2013 | Hashimura | ............ | B21J 15/025 428/594 |
| 8,641,131 B2 * | 2/2014 | Honda | ................. | B62D 25/025 296/187.12 |
| 8,678,481 B2 * | 3/2014 | Tamura | ................ | B62D 25/025 296/193.05 |
| 9,045,165 B2 * | 6/2015 | Kurokawa | ............. | B62D 25/02 |
| 9,409,605 B2 * | 8/2016 | Shinoda | ................ | B62D 25/04 |
| 9,643,654 B2 * | 5/2017 | Furusaki | .............. | B62D 21/152 |
| 2004/0012230 A1 | 1/2004 | Burge | | |
| 2006/0097533 A1 | 5/2006 | Watanabe et al. | | |
| 2010/0194146 A1 | 8/2010 | Nishimura et al. | | |
| 2010/0237659 A1 * | 9/2010 | Ishigame | ............. | B62D 21/157 296/204 |
| 2011/0175399 A1 * | 7/2011 | Nakano | ................ | B62D 21/157 296/193.05 |
| 2013/0049405 A1 | 2/2013 | Kurogi et al. | | |
| 2013/0049408 A1 * | 2/2013 | Kurogi | ................... | B62D 25/02 296/209 |
| 2013/0200650 A1 * | 8/2013 | Matsuoka | ............ | B62D 21/155 296/187.1 |
| 2014/0062130 A1 * | 3/2014 | Yoshimura | ......... | B62D 25/2036 296/187.08 |

FOREIGN PATENT DOCUMENTS

| | | |
|---|---|---|
| JP | 2006-205797 A | 8/2006 |
| JP | 2007-112203 A | 5/2007 |
| JP | 2008-120179 A | 5/2008 |
| JP | 2010-000863 A | 1/2010 |
| JP | 2010-173562 A | 8/2010 |
| JP | 2012-126188 A | 7/2012 |
| JP | 2013-049376 A | 3/2013 |
| WO | 2009/054459 A1 | 4/2009 |

OTHER PUBLICATIONS

International Search Report issued in PCT/JP2014/082150; mailed Mar. 3, 2015.

\* cited by examiner

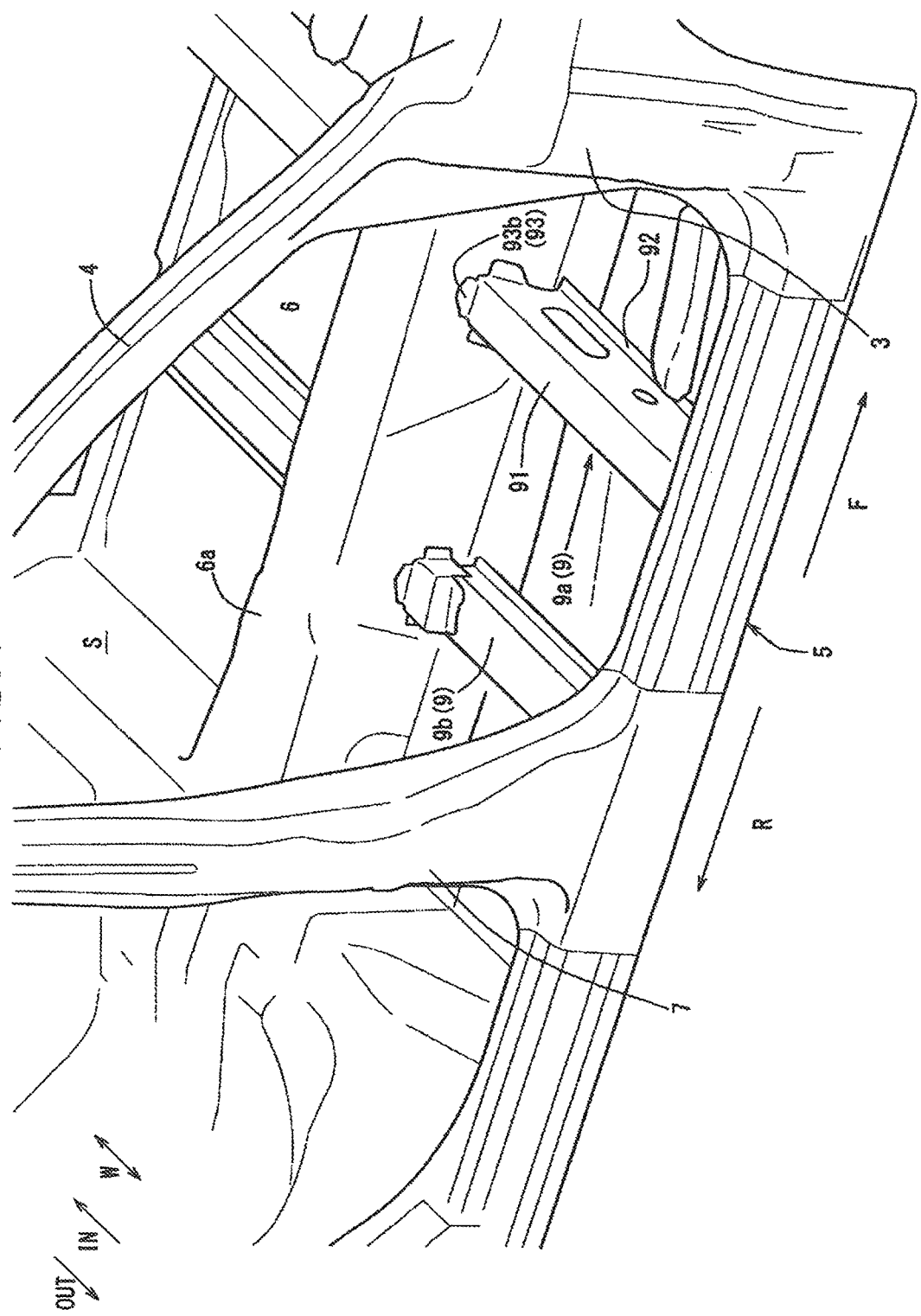

STRUCTURE FOR SIDE PART OF BODY OF VEHICLE

TECHNICAL FIELD

The present invention relates to a vehicle body side part structure for a vehicle, provided with a pillar extending in the up-down direction along a vehicle body side surface, and a side sill connected to the pillar and extending in the vehicle front-rear direction.

BACKGROUND ART

There is known Patent Literature 1, as a technique for reducing intrusion of a pillar or a side sill into the interior of a vehicle chamber at the time of a side collision of a vehicle. Specifically, in Patent Literature 1, a pillar is configured such that a lower part of the pillar is greatly deformed than an upper part of the pillar at the time of a side collision (see FIG. 12 in Patent Literature 1). In this case, it is known that a load input from a side surface of a side sill on the vehicle outer side is input obliquely upwardly on the vehicle inner side from a corner portion (lower outer corner portion) of the side sill on the vehicle outer side and on the lower side in section.

In view of the above, there is proposed an idea of providing a partition member such as a bulkhead in a side sill. According to this configuration, it is possible to smoothly transmit a load from the lower outer corner portion of the side sill via the partition member. This makes it possible to improve the transmission performance of a side collision load.

Further, there is known Patent Literature 2, as another technique such that a partition member is provided in a side sill as described above. In Patent Literature 2, it is expected to improve the load transmission performance because a ridge is provided in a partition member. However, in Patent Literature 2, the shape of the ridge is not a shape capable of sufficiently improving the load transmission performance. Thus, there is further room for improvement.

CITATION LIST

Patent Literature

Patent Literature 1: Japanese Unexamined Patent Publication No. 2010-173562
Patent Literature 2: Japanese Unexamined Patent Publication No. 2006-205797

SUMMARY OF INVENTION

In view of the above, an object of the invention is to provide a vehicle body side part structure for a vehicle, which enables to increase the rigidity of a partition member to be disposed in a side sill, and to improve the load transmission performance at the time of a side collision of the vehicle.

A vehicle body side part structure for a vehicle according to the invention is provided with a pillar extending in an up-down direction along a vehicle body side surface, a side sill connected to a lower part of the pillar and extending in a vehicle front-rear direction, and a partition member provided within the side sill. The side sill includes a side sill outer reinforcement, and a side sill inner member disposed on an inner side of the side sill outer reinforcement in a vehicle width direction, a closed sectional space being formed between the side sill outer reinforcement and the side sill inner member. The partition member includes a partition wall for dividing the closed sectional space of the side sill in the vehicle front-rear direction, and a joint flange to be jointed to an inner surface of the side sill inner member. The partition wall includes a ridge extending from a side of the side sill outer reinforcement to a side of the side sill inner member, and connected to the joint flange. The ridge includes a widening portion formed at an end thereof close to the joint flange.

According to the invention, it is possible to increase the rigidity of the joint flange and the rigidity of the partition member itself, and to efficiently transmit a side collision load input from the vehicle outer side to the joint flange to be joined to the inner surface of the side sill inner member.

BRIEF DESCRIPTION OF DRAWINGS

FIG. 1A and FIG. 1B are diagrams for describing a structure of a bulkhead, wherein FIG. 1A is a perspective view, and FIG. 1B is an exploded perspective view;

FIG. 7 is a perspective view of the vehicle body side part when viewed obliquely from the front side on the outer side of the vehicle chamber.

DESCRIPTION OF EMBODIMENTS

In the following, an embodiment of the invention is described in details based on the drawings.

Figure 1A:
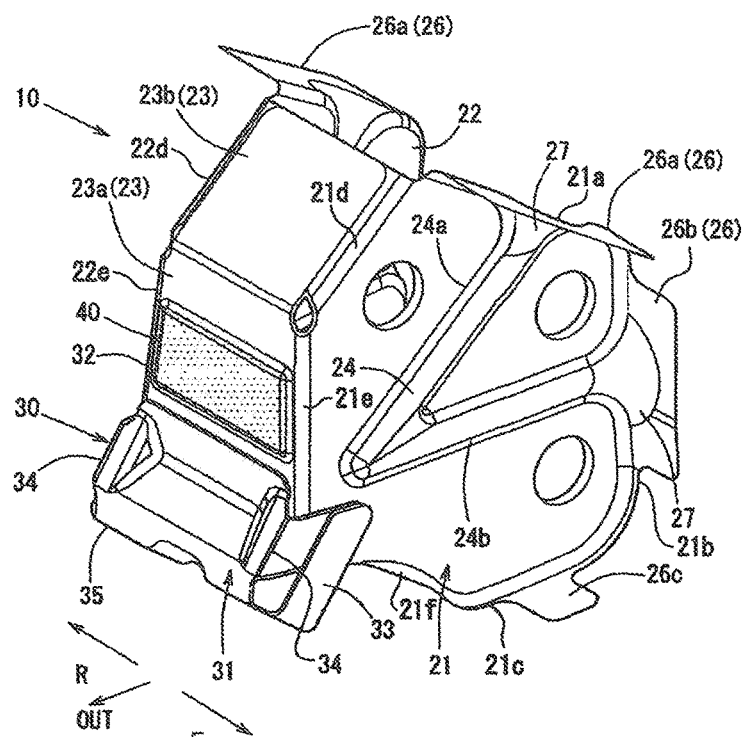
Figure 1B:
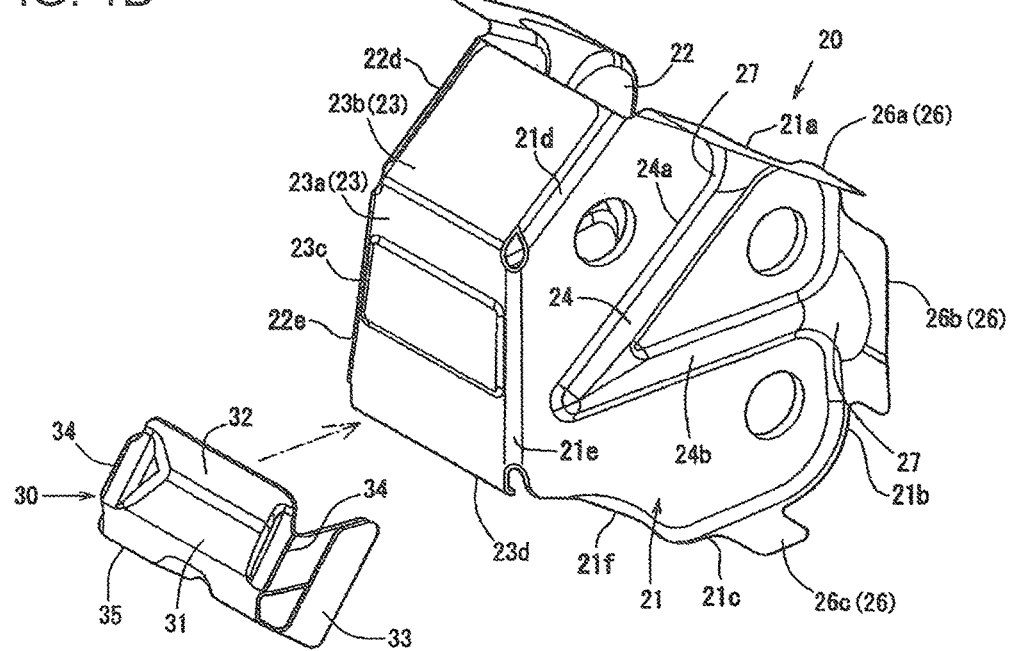
Figure 2:
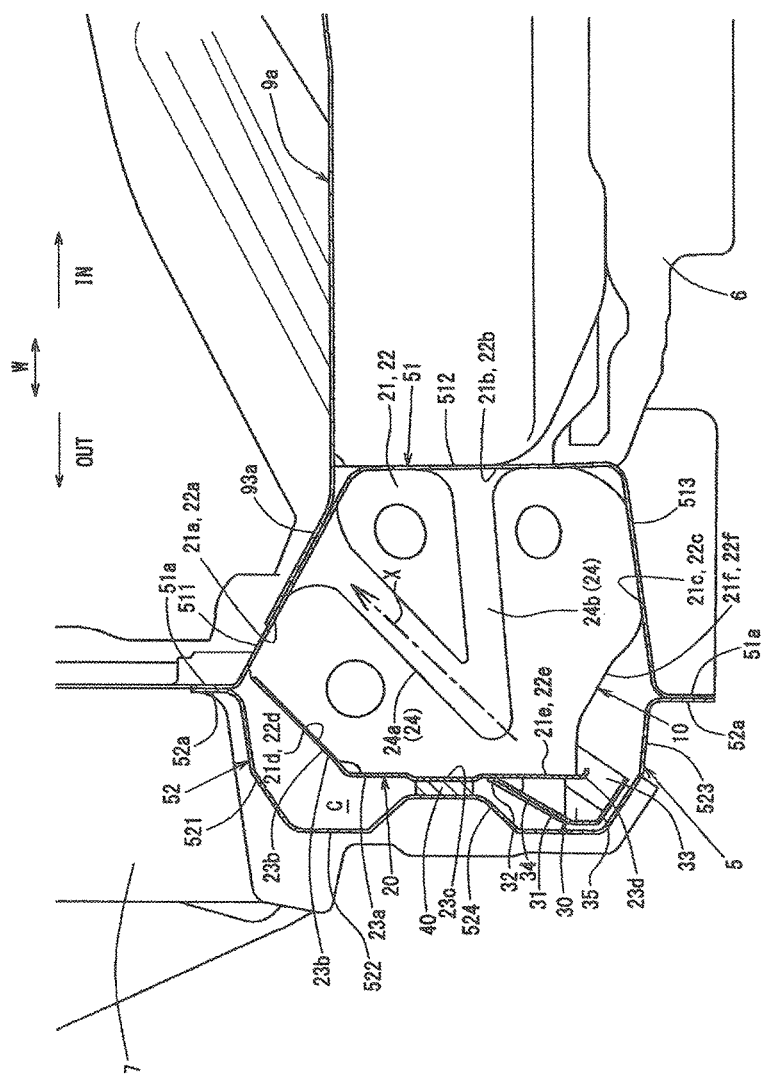
FIG. 2 is a sectional view of a portion of a side sill where the bulkhead is mounted.
Figure 3:
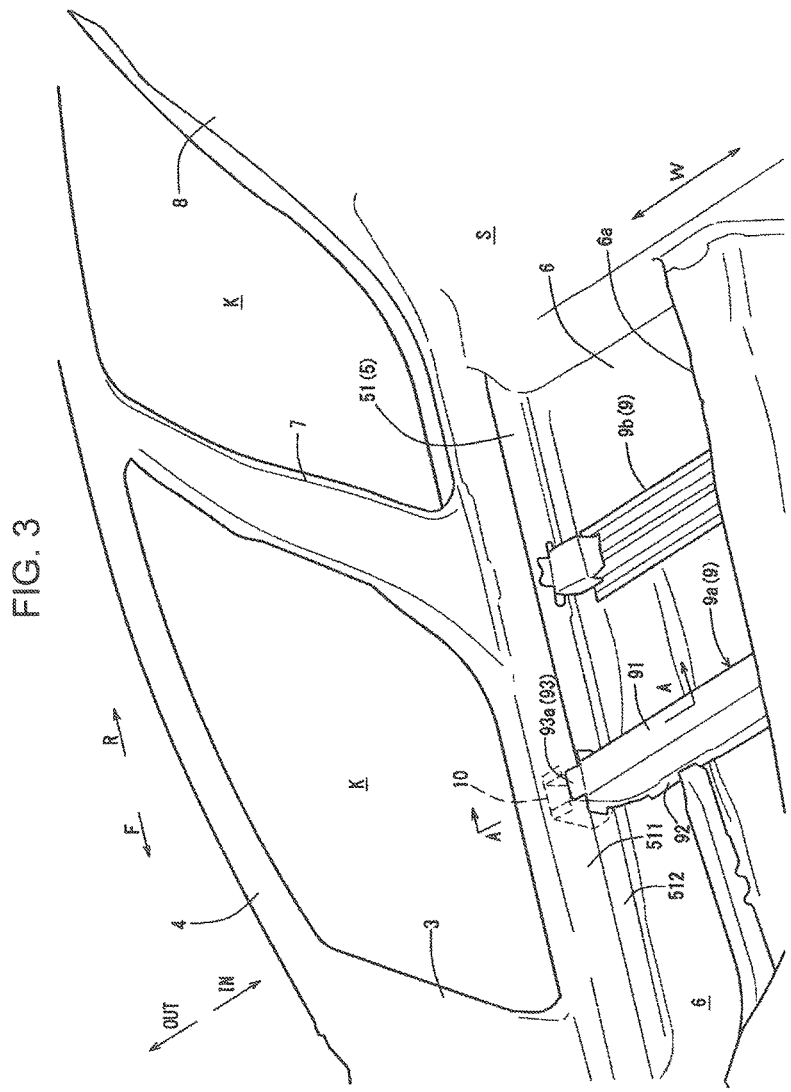
FIG. 3 is a perspective view of a vehicle body side part when viewed obliquely from the front side in a vehicle chamber.
Figure 4:
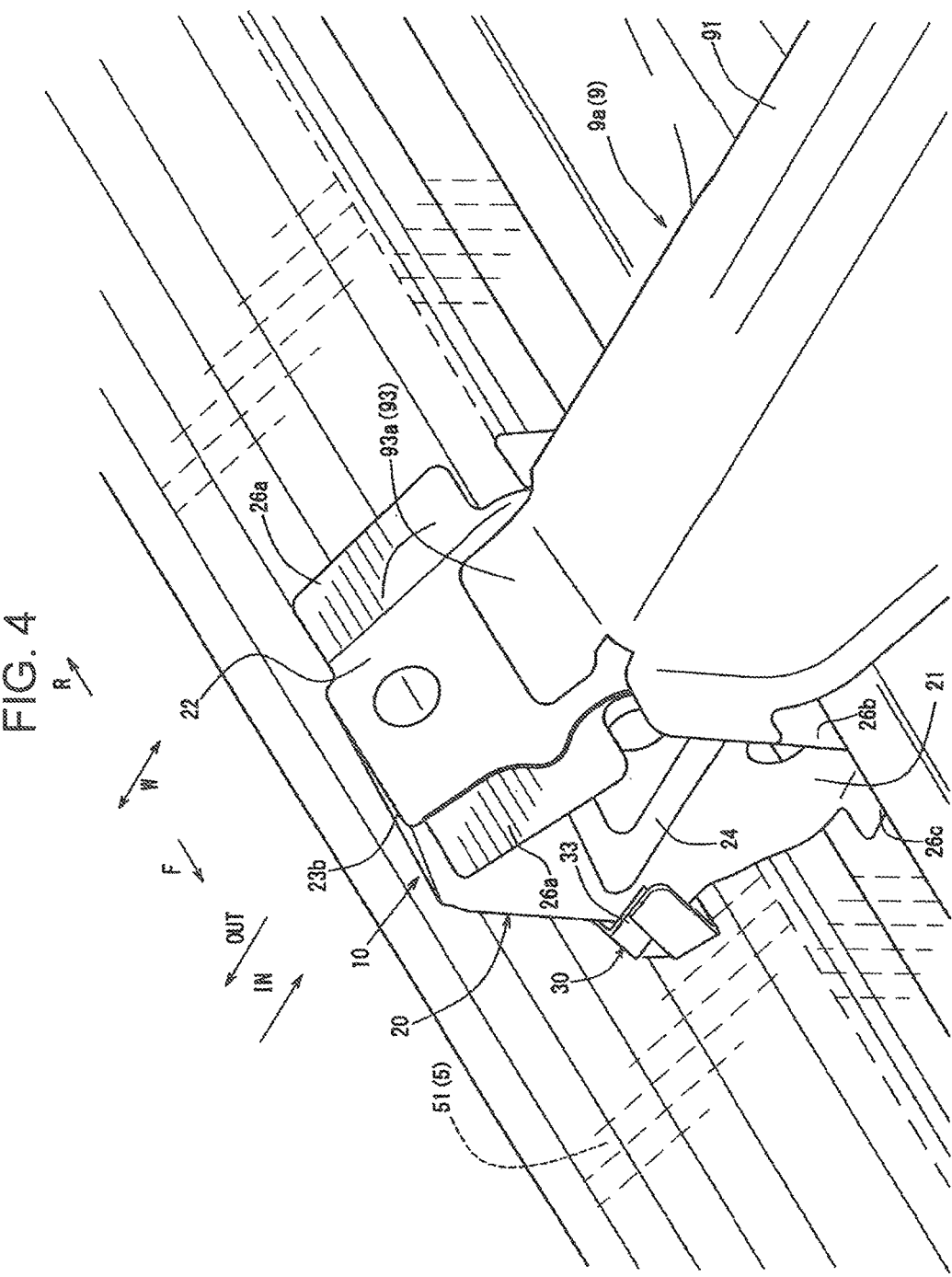
FIG. 4 is an enlarged perspective view illustrating a state that the bulkhead mounted portion is seen through a side sill inner member.
Figure 5:
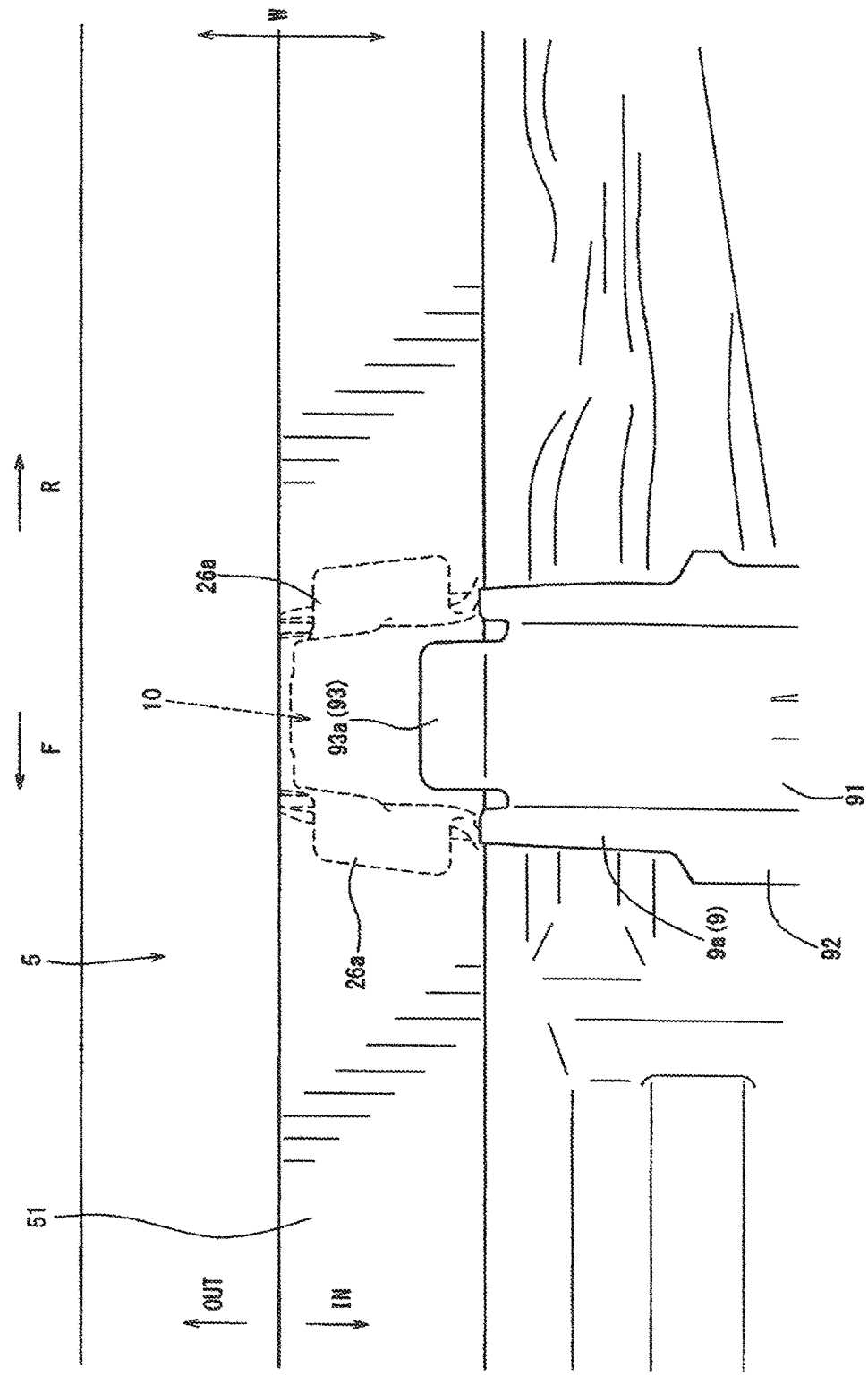
FIG. 5 is an enlarged plan view of the bulkhead mounted portion.
Figure 6:
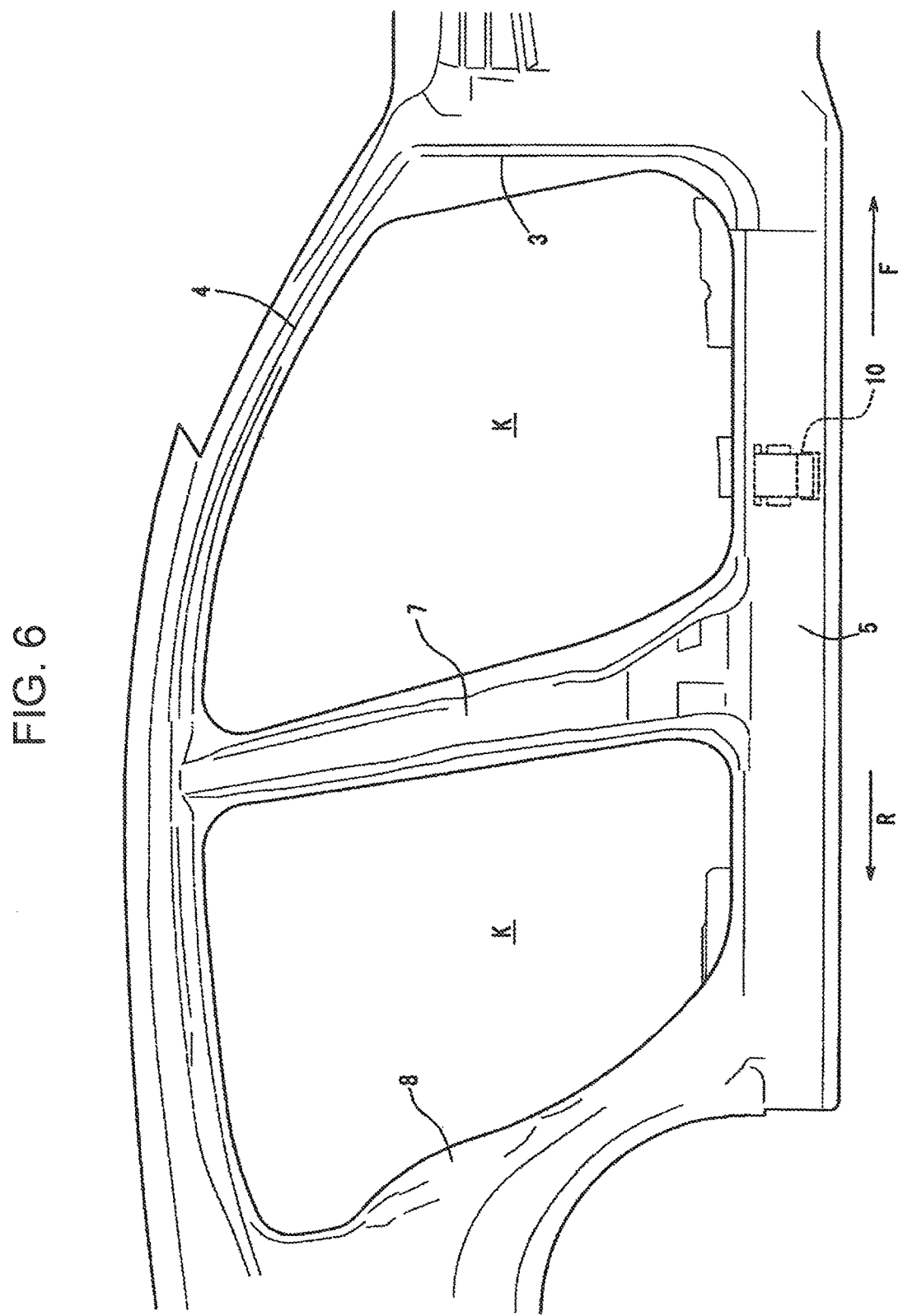
FIG. 6 is a side view of the vehicle body side part when viewed from the outer side of the vehicle chamber.

FIG. 1A and FIG. 1B are respectively a perspective view and an exploded perspective view of a bulkhead 10. FIG. 2 is a sectional view of a portion of a side sill 5 where the bulkhead 10 is mounted, specifically, a sectional view taken along the arrow A-A in FIG. 3. FIG. 3 is a perspective view of a vehicle body side part when viewed obliquely from the front side in a vehicle chamber. FIG. 4 is an enlarged perspective view illustrating a state that the bulkhead mounted portion is seen through a side sill inner member 51. FIG. 5 is an enlarged plan view of the bulkhead mounted portion. FIG. 6 is a side view of the vehicle body side part when viewed from the outer side of the vehicle chamber. FIG. 7 is a perspective view of the vehicle body side part when viewed obliquely from the front side on the outer side of the vehicle chamber. In the drawings, the arrow F denotes the vehicle front side, the arrow R denotes the vehicle rear side, and the arrow W denotes the vehicle width direction. Further, the arrow IN denotes inwardly in the vehicle width direction, and the arrow OUT denotes outwardly in the vehicle width direction.

As illustrated in FIG. 6 and FIG. 7, a vehicle in the embodiment includes a vehicle chamber S located behind an unillustrated engine room. A side part of the vehicle chamber S, namely, a vehicle body side part includes a hinge pillar 3, a front pillar 4, a center pillar 7, and a rear pillar 8 in this order from the vehicle front side. The front pillar 4 is disposed to extend from the upper end of the hinge pillar 3 while being inclined obliquely and rearwardly (so that the rear part of the front pillar 4 is higher than the front part of the front pillar 4). The center pillar 7 is disposed to extend in the up-down direction in the vicinity of the middle of the vehicle body side part in the front-rear direction.

The side sill 5 is disposed below the pillars. The side sill 5 is disposed to extend in the vehicle front-rear direction along a lateral end of a floor panel 6 (see FIG. 2) constituting the floor surface of the vehicle chamber S. The side sill 5 is joined to the lower end of the hinge pillar 3, to the lower end of the center pillar 7, and to the lower end of the rear pillar 8.

The floor panel 6 integrally includes a center floor tunnel 6a at the middle part thereof in the vehicle width direction. The center floor tunnel 6a protrudes upwardly, and extends in the vehicle front-rear direction. A floor cross member 9 (9a, 9b) for connecting between the inner surface of the side sill 5 in the vehicle width direction and the center floor tunnel 6a in the vehicle width direction is disposed on the upper surface of the floor panel 6.

The vehicle body side part includes a pair of front and rear side surface openings K, which are defined by the hinge pillar 3, the front pillar 4, the side sill 5, the center pillar 7, the rear pillar 8, and others. The side surface opening K is openably and closably covered by an unillustrated door mounted to the hinge pillar 3 or to the center pillar 7 via door hinges.

As illustrated in FIG. 2, the side sill 5 includes a side sill outer reinforcement 52, and the side sill inner member 51 disposed on the inner side of the side sill outer reinforcement 52 in the vehicle width direction. The side sill inner member 51 and the side sill outer reinforcement 52 are joined to each other in such a manner that a closed sectional space C extending in the vehicle front-rear direction is formed therebetween.

More specifically, the side sill inner member 51 includes an upper wall 511 extending inwardly in the vehicle width direction and inclined downwardly, a vertical wall 512 extending downwardly from the inner end of the upper wall 511 in the vehicle width direction, and a bottom wall 513 extending outwardly in the vehicle width direction and inclined downwardly from the lower end of the vertical wall 512. The side sill inner member 51 is formed into a generally C shape in section, and is opened outwardly in the vehicle width direction as a whole. A flange portion 51a extending in the up-down direction is formed on each of the outer end of the upper wall 511 in the vehicle width direction, and the outer end of the bottom wall 513 in the vehicle width direction.

The side sill outer reinforcement 52 includes an upper wall 521 extending outwardly in the vehicle width direction and inclined downwardly, a vertical wall 522 extending downwardly from the outer end of the upper wall 521 in the vehicle width direction, and a bottom wall 523 extending inwardly in the vehicle width direction and inclined downwardly from the lower end of the vertical wall 522. The side sill outer reinforcement 52 is formed into a generally C shape in section, and is opened inwardly in the vehicle width direction as a whole. A flange portion 52a extending in the up-down direction is formed on each of the inner end of the upper wall 521 in the vehicle width direction, and the inner end of the bottom wall 523 in the vehicle width direction. The vertical wall 522 includes a vertical wall ridge 524 having a sectional shape such that the vertical wall ridge 524 protrudes inwardly in the vehicle width direction, and extends in the vehicle front-rear direction.

The flange portion 51a of the side sill inner member 51, and the flange portion 52a of the side sill outer reinforcement 52 are joined to overlap each other. According to this configuration, the side sill inner member 51 and the side sill outer reinforcement 52 are combined to each other, whereby the side sill 5 having the closed sectional space C therein is formed.

The floor cross member 9 includes a front floor cross member 9a extending in the vehicle width direction at an intermediate position between the hinge pillar 3 and the center pillar 7 in the front-rear direction, and a rear floor cross member 9b extending in the vehicle width direction in the vicinity of the center pillar 7.

The front floor cross member 9a includes a member main body 91 of a generally C shape in section and opened downwardly, a flange portion 92 formed at the lower end of the member main body 91 and joined to the floor panel 6, and an end flange 93 (93a, 93b) formed on both ends of the member main body 91 in the vehicle width direction and joined to the side sill 5 and to the center floor tunnel 6a.

The end flange 93 (93a, 93b) extends from both ends of an upper surface 91a of the member main body 91 formed into a generally C shape in section. The end flange 93a on the outer side in the vehicle width direction is formed along the upper surface of the upper wall 511 of the side sill inner member 51, and is joined to the upper wall 511.

As illustrated in FIG. 2 to FIG. 4, a bulkhead 10 (corresponding to a "partition member" in the claims) is disposed in the closed sectional space C of the side sill 5 at a joint position between the front floor cross member 9a and the side sill inner member 51.

As illustrated in FIG. 1A and FIG. 1B, the bulkhead 10 includes a first member 20 composing a main part of the bulkhead 10, a second member 30 to be mounted to a corner portion (hereinafter, called as a lower outer corner portion) of the first member 20 on the outer side in the vehicle width direction and on the lower side, and a vibration attenuation member 40 to be mounted on the outer surface of the first member 20 in the vehicle width direction.

The first member 20 includes a front partition wall 21 located on the vehicle front side, a rear partition wall 22 disposed away from the front partition wall 21 on the vehicle rear side by a predetermined distance, and a connection wall 23 for connecting between the outer end of the front partition wall 21 and the outer end of the rear partition wall 22 in the vehicle front-rear direction. The first member 20 is formed into a generally C shape in section, and is opened inwardly in the vehicle width direction as a whole. The first member 20 having the aforementioned shape is formed by bending a plate member of a predetermined thickness. One of the front partition wall 21 and the rear partition wall 22 corresponds to a "partition wall" in the claims, and the other of the front partition wall 21 and the rear partition wall 22 corresponds to an "additional partition wall" in the claims.

The front partition wall 21 (rear partition wall 22) includes, when viewed from the vehicle front side (when the side sill 5 is viewed in section), an upper inner perimeter 21a (22a) inclined along the upper wall 511 of the side sill inner member 51, an inner perimeter 21b (22b) extending vertically along the vertical wall 512, a lower inner perimeter 21c (22c) formed along the bottom wall 513, an outer perimeter 21e (22e) extending vertically at a position away from the vertical wall 522 on the inner side in the vehicle width direction by a predetermined distance, an upper outer perimeter 21d (22d) inclined to connect between the upper end of the outer perimeter 21e (22e) and the outer end of the upper inner perimeter 21a (22a) in the vehicle width direction, and a lower outer perimeter 21*f* (22*f*) formed along an inwardly convex curve to connect between the lower end of the outer perimeter 21*e* (22*e*) and the outer end of the lower inner perimeter 21*c* (22*c*) in the vehicle width direction. The front partition wall 21 (rear partition wall 22) is formed into a generally modified hexagonal shape as a whole.

The upper outer perimeter 21*d* (22*d*) is formed to extend substantially parallel to the direction indicated by the arrow X (see FIG. 2), which extends from the lower outer corner portion of the first member 20 toward the upper wall 511 in an inclined direction inwardly in the vehicle width direction and upwardly. In the following, the direction indicated by the arrow X is called as an inward and obliquely upper direction X.

A flange 26 (26*a*, 26*b*, 26*c*) to be joined to the inner surface of the side sill inner member 51 is formed on the upper inner perimeter 21*a* (22*a*), on the inner perimeter 21*b* (22*b*), and on the lower inner perimeter 21*c* (22*c*). The flange 26*a* corresponds to a "joint flange" in the claims, and the flange 26*b* corresponds to an "additional joint flange" in the claims.

Each of the front partition wall 21 and the rear partition wall 22 is formed with a V-shaped ridge 24 of a generally V shape when viewed from the vehicle front side (when the side sill 5 is viewed in section). Specifically, the V-shaped ridge 24 includes a first ridge 24*a* (corresponding to a "ridge" in the claims) extending from the vicinity of the lower outer corner portion toward the upper wall 511 in the inward and obliquely upper direction X, and a second ridge 24*b* (corresponding to an "additional ridge" in the claims) extending from the vicinity of the lower outer corner portion toward the vertical wall 512. In the embodiment, the V-shaped ridge 24 (the first ridge 24*a* and the second ridge 24*b*) is a portion obtained by projecting a ridge forming area of the front partition wall 21 (rear partition wall 22) forwardly or rearwardly than the peripheral area of the ridge forming area. The V-shaped ridge 24 is formed by a bending process.

The end of the first ridge 24*a* is connected to the flange 26*a*. The end of the first ridge 24*a* includes a widening portion 27 of a shape such that the width thereof increases toward the flange 26*a*. Likewise, the end of the second ridge 24*b* is connected to the flange 26*b*, and includes a widening portion 27 of a shape such that the width thereof increases toward the flange 26*b*. As illustrated in FIG. 2, the widening portion 27 of the first ridge 24*a* is formed at a position where the widening portion 27 overlaps the end flange 93*a* of the front floor cross member 9*a* via the upper wall 511.

The connection wall 23 includes an upper connection wall 23*b*, and a lateral vertical connection wall 23*a* extending downwardly from the lower end of the upper connection wall 23*b*. The connection wall 23 is formed into a V shape of a relatively shallow angle as a whole.

The upper connection wall 23*b* is a wall portion extending along a plane generally parallel to the inward and obliquely upper direction X. The upper connection wall 23*b* is connected to the upper outer perimeter 21*d* of the front partition wall 21 and to the upper outer perimeter 22*d* of the rear partition wall 22 in the vehicle front-rear direction.

The lateral vertical connection wall 23*a* is a wall portion extending along a generally vertical plane. The lateral vertical connection wall 23*a* is connected to the outer perimeter 21*e* of the front partition wall 21 and to the outer perimeter 22*e* of the rear partition wall 22 in the vehicle front-rear direction.

The lateral vertical connection wall 23*a* includes a vibration attenuation member installation portion 23*c* which allows installation of the vibration attenuation member 40 to be described later at a position facing the vertical wall ridge 524 of the side sill outer reinforcement 52 in a state that the bulkhead 10 is mounted in the closed sectional space C. Further, a bent lower end 23*d* formed by bending the lateral vertical connection wall 23*a* inwardly in the vehicle width direction is formed on the lower end of the lateral vertical connection wall 23*a*.

The vibration attenuation member 40 is installed on the vibration attenuation member installation portion 23*c* of the lateral vertical connection wall 23*a*. The vibration attenuation member 40 is obtained by heating to cure an uncured vibration attenuation material in the form of paste in a vehicle body manufacturing process. Specifically, the vibration attenuation member 40 is obtained by applying an uncured vibration attenuation material on the vibration attenuation member installation portion 23*c* so that the uncured vibration attenuation material is interposed between the vibration attenuation member installation portion 23*c* and the side sill outer reinforcement 52, and by heating to cure the uncured vibration attenuation material in a drying process of electrodeposition coating that follows the applying process. When the aforementioned process is performed, it is desirable to apply an uncured vibration attenuation material by spot applying in order to prevent occurrence of air pockets, which may turn to be an unelectrodeposited portion where electrodeposition coating is not performed. Alternatively, it is possible to mount a thin pad of a generally rectangular shape in front view and composed of resin capable of absorbing vibrations to the vibration attenuation member installation portion 23*c*, as a vibration attenuation member, in place of the above process.

The second member 30 is mounted to the lower outer corner portion of the first member 20, in other words, in the vicinity of the lower end of the lateral vertical connection wall 23*a* or in the vicinity of an intersection between the outer perimeter 21*e* (22*e*) and the lower outer perimeter 21*f* (22*f*) of the front partition wall 21 (rear partition wall 22). When the second member 30 is in the mounted state, the second member 30 includes a second member main body 31 (corresponding to a "main body portion" in the claims) extending along a plane substantially parallel to the inward and obliquely upper direction X, a mounted flange 32 protruding upwardly from the upper end of the second member main body 31 and joined to the lower part of the lateral vertical connection wall 23*a* of the first member 20, and a pair of lateral extensions 33 protruding inwardly in the vehicle width direction from the front end and the rear end of the second member main body 31, and joined to the front partition wall 21 and to the rear partition wall 22 of the first member 20. Each of the lateral extensions 33 has a shape such that the lateral extension 33 extends along the inward and obliquely upper direction X when viewed from the vehicle front side (when the side sill 5 is viewed in section). The second member 30 is formed by bending a plate member of a predetermined thickness.

Further, the second member 30 includes a ridge line portion 34 obtained by forming the front perimeter and the rear perimeter of the second member main body 31 into a curve to protrude upwardly, and an opposing lower surface portion 35 formed to extend in an inclined direction inwardly in the vehicle width direction and downwardly from the lower end of the second member main body 31. When the second member 30 is mounted to the first member 20, the opposing lower surface portion 35 is disposed to face the lower outer corner portion of the side sill outer reinforcement 52.

As illustrated in FIG. 2, the bottom wall 523 of the side sill outer reinforcement 52 includes a portion extending inwardly in the vehicle width direction and inclined downwardly at a relatively sharp angle from the lower end of the vertical wall 522, and a portion extending inwardly in the vehicle width direction and inclined at a relatively shallow angle (approximate to a horizontal state) from the end of the aforementioned portion. An inflection point is formed at a position where these two portions intersect each other due to a difference in the inclination angle. In the embodiment, the lower outer corner portion of the side sill outer reinforcement 52 is a portion of the bottom wall 523 having a sharp inclination angle, in other words, a portion from the lower end of the vertical wall 522 to the inflection point. The opposing lower surface portion 35 of the second member 30 is disposed to face the lower outer corner portion of the side sill outer reinforcement 52, and extends substantially parallel thereto.

As illustrated in FIGS. 1A and 1B, the second member 30 is mounted on the lower outer corner portion of the first member 20, and the bulkhead 10 is formed by the first member 20 and the second member 30.

The bulkhead 10 formed by assembling the first member 20 and the second member 30 is disposed in such a manner that the flange 26 is abutted against the inner surface of the side sill inner member 51 in the closed sectional space C of the side sill 5, and the flange 26 is rigidly joined to the side sill inner member 51 by spot welding. When the aforementioned operation is performed, the lateral vertical connection wall 23a and the upper connection wall 23b are disposed at a position away from the inner surface of the side sill outer reinforcement 52. Further, the vibration attenuation member installation portion 23c of the lateral vertical connection wall 23a and the vertical wall ridge 524 of the side sill outer reinforcement 52 are disposed to face each other. The vibration attenuation member 40 installed on the vibration attenuation member installation portion 23c is interposed between the lateral vertical connection wall 23a and the side sill outer reinforcement 52.

The second member 30 of the bulkhead 10 is disposed below the vertical wall ridge 524, and in a space between the lower outer corner portion of the first member 20 and the lower outer corner portion of the side sill 5.

As described above, the vehicle body side part structure for a vehicle in the embodiment is provided with the center pillar 7 extending in the up-down direction along a vehicle body side surface, the side sill 5 connected to the lower part of the center pillar 7 and extending in the vehicle front-rear direction, and the bulkhead 10 provided within the side sill 5. The side sill 5 includes the side sill outer reinforcement 52, and the side sill inner member 51 to be disposed on the inner side of the side sill outer reinforcement 52 in the vehicle width direction. The side sill 5 further includes the closed sectional space C between the side sill outer reinforcement 52 and the side sill inner member 51. The bulkhead 10 includes the front partition wall 21 and the rear partition wall 22 for dividing the closed sectional space C of the side sill 5 in the vehicle front-rear direction, and the flange 26a formed on the upper part of each of the front partition wall 21 and the rear partition wall 22 and joined to the upper wall 511 of the side sill inner member 51. Each of the front partition wall 21 and the rear partition wall 22 includes the first ridge 24a extending from the outer side to the inner side in the vehicle width direction and joined to the flange 26a. The widening portion 27 is formed at the end of the first ridge 24a close to the flange 26a. According to this configuration, it is possible to increase the rigidity of the bulkhead 10 to be disposed within the side sill 5. This is advantageous in improving the load transmission performance at the time of a side collision.

Specifically, the flange 26a of the bulkhead 10 is joined to the upper wall 511 of the side sill inner member 51, and the first ridge 24a formed on each of the front partition wall 21 and the rear partition wall 22 of the bulkhead 10 is connected to the flange 26a. Therefore, it is possible to increase the rigidity of the flange 26a and the rigidity of the bulkhead 10 itself. Further, the first ridge 24a is formed to extend along the inward and obliquely upper direction X, and the widening portion 27 is formed at the end of the first ridge 24a close to the flange 26a. Therefore, at the time of a side collision of a vehicle, a load is transmitted to the entirety of the surface of the flange 26a via the widening portion 27 of the first ridge 24a, and the load is further transmitted to the upper wall 511 of the side sill inner member 51 via the entirety of the surface of the flange 26a. Thus, a side collision load is efficiently transmitted to the side sill inner member 51. This makes it possible to improve the load transmission performance at the time of a side collision of a vehicle.

There may be an idea of forming the first ridge 24a to extend toward a corner portion where the upper wall 511 and the vertical wall 512 intersect each other in order to increase the load transmission efficiency. However, in the embodiment, the first ridge 24a is formed to extend toward the flange 26a in the vicinity of a corner portion where the upper wall 511 and the vertical wall 512 intersect each other, in place of the corner portion. The reason for this is described below.

The flange 26a is naturally disposed on the outer side in the vehicle width direction than a corner portion where the upper wall 511 and the vertical wall 512 intersect each other in order to join the flange 26a to the lower surface of the upper wall 511 (by spot welding). Therefore, when the widening portion 27 formed on the end of the first ridge 24a is disposed at the corner portion between the upper wall 511 and the vertical wall 512, it is difficult to connect the widening portion 27 to the flange 26a. This may lower the rigidity of the flange 26a.

Further, the bulkhead 10 configured such that the widening portion 27 is disposed at a corner portion between the upper wall 511 and the vertical wall 512 has excessively poor processability, and it is difficult to mold such a bulkhead.

In contrast, in the embodiment, the widening portion 27 of the first ridge 24a is formed to be connected to the flange 26a, which is joined to the inner surface of the upper wall 511. This makes it easy to mold the bulkhead 10. Further, even in this case, welding (spot welding) the flange 26a at a position closest to the corner portion makes it possible to directly transmit a load to the inner surface of the side sill inner member 51. This makes it possible to sufficiently increase the load transmission efficiency.

Further, in the embodiment, the first ridge 24a is formed to extend generally linearly from the lower outer corner portion of each of the front partition wall 21 and the rear partition wall 22 toward the flange 26a. The extending direction of the first ridge 24a is generally parallel to the inward and obliquely upper direction X, which is a load input direction at the time of a side collision. Therefore, it is possible to efficiently transmit a load input from the lower outer corner portion of the side sill 5 in the inward and obliquely upper direction X via the first ridge 24a.

Further, in the embodiment, in addition to the flange 26a to be joined to the upper wall 511 of the side sill inner member 51, the flange 26b to be joined to the vertical wall 512 of the side sill inner member 51 is formed on each of the front partition wall 21 and the rear partition wall 22. Further, in addition to the first ridge 24a to be connected to the flange 26a, each of the front partition wall 21 and the rear partition wall 22 includes the second ridge 24b extending generally linearly from the outer end of the first ridge 24a in the vehicle width direction toward the flange 26b. The first ridge 24a and the second ridge 24b form the V-shaped ridge 24 of a V shape when viewed from the vehicle front side. According to this configuration, it is possible to efficiently transmit a load input from the lower outer corner portion of the side sill outer reinforcement 52 while efficiently distributing the load at the time of a side collision. Further, the aforementioned configuration allows for the first ridge 24a and the second ridge 24b to resist against bending and torsion by a side collision load in cooperation with each other. This is advantageous in increasing the rigidity of the bulkhead 10.

Further, in the embodiment, the end flange 93a to be jointed to the upper wall 511 of the side sill inner member 51 is formed on the end of the front floor cross member 9a extending in the vehicle width direction. The bulkhead 10 is disposed in such a manner that the widening portion 27 of the first ridge 24a and the end flange 93a overlap each other via the upper wall 511. According to this configuration, it is possible to efficiently transmit a side collision load to the front floor cross member 9a via the flange 26a and via the end flange 93a that overlaps the flange 26a. This makes it easy to control deformation of the center pillar 7 and the side sill 5 at the time of a side collision. Further, it is possible to increase the rigidity of the vehicle body by cooperation of the side sill inner member 51 and the front floor cross member 9a.

Further, in the embodiment, the bulkhead 10 is formed of the first member 20 including the front partition wall 21, the rear partition wall 22, and the connection wall 23 for connecting between the front partition wall 21 and the rear partition wall 22 in the vehicle front-rear direction; and the second member 30 independently mounted to the lower outer corner portion of the first member 20. The second member 30 includes the second member main body 31, the opposing lower surface portion 35 formed below the second member main body 31 to face the lower outer corner portion of the side sill outer reinforcement 52, and the paired lateral extensions 33 protruding inwardly in the vehicle width direction from the front end and the rear end of the second member main body 31, and extending along the inward and obliquely upper direction X when viewed from the vehicle front side (when the side sill 5 is viewed in section). The paired lateral extensions 33 are respectively jointed to the front partition wall 21 and to the rear partition wall 22 of the first member 20. According to this configuration, the second member 30 is disposed by utilizing the space between the lower outer corner portion of the first member 20 and the lower outer corner portion of the side sill outer reinforcement 52, and the second member 30 is joined to the first member 20. This makes it possible to increase the rigidity of the bulkhead 10 while making it easy to mold each of the first member 20 and the second member 30. Further, the lateral extensions 33 of the second member 30 to be joined to the front partition wall 21 and to the rear partition wall 22 of the first member 20 are formed to extend along the inward and obliquely upper direction X when viewed from the vehicle front side. This makes it possible to efficiently transmit a side collision load input from the lower outer corner portion of the side sill 5 in the inward and obliquely upper direction X from the second member 30 to the first member 20.

Specifically, the second member 30 provided independently of the first member 20 includes the lateral extensions 33 extending in the direction of a side collision load input from the lower outer corner portion of the side sill 5 in the inward and obliquely upper direction X. The lateral extensions 33 are joined to the front partition wall 21 and to the rear partition wall 22 of the first member 20. This makes it possible to efficiently transmit a side collision load input from the side sill 5 to the second member 30, to the first member 20 via the lateral extensions 33. This is advantageous in improving the load transmission performance.

Further, in the embodiment, the side surface of the second member 30 includes the ridge line portion 34 extending generally parallel to the inward and obliquely upper direction X, wherein a part near the upper part of the ridge line portion 34 is joined to the first member 20 in a mounted state of the second member 30. According to this configuration, it is possible to increase the rigidity of the second member 30 itself and to increase the rigidity of a joint portion between the second member 30 and the first member 20, consequently, increase the rigidity of the bulkhead 10. This is advantageous in smoothly transmitting a side collision load via the bulkhead 10.

Further, in the embodiment, the first member 20 includes the bent lower end 23d in the vicinity of the joint portion between the first member 20 and the second member 30. The bent lower end 23d is formed by bending the connection wall 23 in such a manner as to protrude from the lower end of the connection wall 23 inwardly in the vehicle width direction. This makes it possible to increase the rigidity of a part in the vicinity of the joint portion between the first member 20 and the second member 30, and consequently increase the rigidity of the bulkhead 10. This is advantageous in smoothly transmitting a side collision load via the bulkhead 10.

Further, in the embodiment, the front partition wall 21 (rear partition wall 22) includes, when viewed from the vehicle front side, the outer perimeter 21e (22e) extending in the up-down direction along the vertical wall 522 of the side sill outer reinforcement 52. The connection wall 23 includes the lateral vertical connection wall 23a for connecting between the outer perimeter 21e of the front partition wall 21 and the outer perimeter 22e of the rear partition wall 22. The vibration attenuation member 40 is disposed between the lateral vertical connection wall 23a and the vertical wall 522 of the side sill outer reinforcement 52. According to this configuration, it is possible to improve the performance of suppressing vibrations of a vehicle, or improve the NVH performance by the vibration attenuation member 40 disposed between the lateral vertical connection wall 23a and the side sill outer reinforcement 52.

Further, in the embodiment, the front partition wall 21 (rear partition wall 22) includes, when viewed from the vehicle front side, the upper outer perimeter 21d (22d) extending from the upper end of the outer perimeter 21e (22e) along the inward and obliquely upper direction X. The connection wall 23 includes the upper connection wall 23b for connecting between the upper outer perimeter 21d of the front partition wall 21 and the upper outer perimeter 22d of the rear partition wall 22. According to this configuration, the upper connection wall 23b is formed into a generally linear shape in a direction parallel to the inward and obliquely upper direction X. This makes it possible to efficiently transmit a side collision load input from the lower outer corner portion of the side sill 5 to the flange 26*a* via the connection wall 23 (upper connection wall 23*b*). Thus, it is possible to smoothly transmit a load in the inward and obliquely upper direction X. This is advantageous in improving the load transmission performance at the time of a side collision.

Further, the upper outer perimeter 21*d* of the front partition wall 21 and the upper outer perimeter 22*d* of the rear partition wall 22 are connected to each other by the upper connection wall 23*b*. This makes it possible to prevent deforming the bulkhead 10 (first member 20) in such a manner that the front partition wall 21 and the rear partition wall 22 are moved away from each other by an input side collision load. Thus, it is possible to prevent lowering of the load transmission performance.

Further, in the embodiment, the second member 30 is connected to a portion of each of the front partition wall 21 and the rear partition wall 22 which faces the lower outer corner portion of the side sill outer reinforcement 52. This makes it possible to prevent deforming the first member 20 in such a manner that the front partition wall 21 and the rear partition wall 22 are moved away from each other by an input side collision load. Thus, it is possible to prevent lowering of the load transmission performance.

Further, as illustrated in FIG. 2, in the embodiment, the bulkhead 10 is disposed at such a position that the distance between the second member 30 and the side sill outer reinforcement 52 is substantially constant in the vicinity of the lower outer corner portion of the side sill outer reinforcement 52. According to this configuration, the load input from the side sill outer reinforcement 52 is exerted in a wide area of the second member 30 substantially at the same timing. This makes it possible to effectively improve the load transmission performance.

The aforementioned embodiment is merely a preferred example of the invention. Various modifications are applicable to the embodiment, as far as such modifications do not depart from the gist of the invention.

For instance, in the embodiment, the vertical wall ridge 524 protruding inwardly in the vehicle width direction is formed on the vertical wall 522 of the side sill outer reinforcement 52, and the first member 20 is disposed away from the vertical wall ridge 524 by the distance corresponding to the vibration attenuation member 40. Thus, a relatively large space capable of installing the second member 30 is formed between the lower outer corner portion of the side sill 5 and the first member 20. On the other hand, even when the side sill 5 is not provided with the vertical wall ridge 524, the first member 20 may be disposed away from the lower outer corner portion of the side sill outer reinforcement 52 in order to secure a work space for performing e.g. anti corrosion treatment to the inside of the side sill 5. In this case, the second member 30 may be disposed in the work space.

Further, in the embodiment, the first member 20 is formed of a plate member having a predetermined thickness. The V-shaped ridge 24 is formed on each of the front partition wall 21 and the rear partition wall 22 by bending the plate member. Alternatively, it is possible to form the V-shaped ridge 24 by making the thickness of a part corresponding to the V-shaped ridge 24 larger than the thickness of the remaining part. The same idea is also applied to the bent lower end 23*d* formed on the lower end of the lateral vertical connection wall 23*a* of the first member 20, and to the ridge line portion 34 formed on the second member main body 31 of the second member 30.

Further, in the embodiment, the V-shaped ridge 24 of a V shape in front view including the first ridge 24*a* extending generally linearly from the lower outer corner portion of the first member 20 toward the flange 26*a*, and the second ridge 24*b* extending generally linearly from the outer end of the first ridge 24*a* in the vehicle width direction toward the flange 26*b* is formed on each of the front partition wall 21 and the rear partition wall 22. Alternatively, it is possible to employ a ridge of various shapes such as an f, shape or a U shape in front view, in place of the V-shaped ridge 24.

The following is a summary of the features disclosed in the aforementioned embodiment, and the advantageous effects of the embodiment.

The technique disclosed in the embodiment relates to a vehicle body side part structure for a vehicle, provided with a pillar extending in an up-down direction along a vehicle body side surface, a side sill connected to a lower part of the pillar and extending in a vehicle front-rear direction, and a partition member provided within the side sill. The side sill includes a side sill outer reinforcement, and a side sill inner member disposed on an inner side of the side sill outer reinforcement in a vehicle width direction, a closed sectional space being formed between the side sill outer reinforcement and the side sill inner member. The partition member includes a partition wall for dividing the closed sectional space of the side sill in the vehicle front-rear direction, and a joint flange to be jointed to an inner surface of the side sill inner member. The partition wall includes a ridge extending from a side of the side sill outer reinforcement to a side of the side sill inner member, and connected to the joint flange. The ridge includes a widening portion formed at an end thereof close to the joint flange.

According to the aforementioned configuration, it is possible to increase the rigidity of the partition member disposed within the side sill. This is advantageous in improving the load transmission performance at the time of a side collision.

Specifically, the joint flange of the partition member is joined to the inner surface of the side sill inner member, and the ridge formed on the partition wall of the partition member is connected to the joint flange. This makes it possible to increase the rigidity of the joint flange and the rigidity of the partition member itself. Further, the ridge is formed to extend from the side of the side sill outer reinforcement to the side of the side sill inner member, and the widening portion is formed on the end of the ridge close to the joint flange. According to this configuration, at the time of a side collision of a vehicle, a load is transmitted to the entirety of the surface of the joint flange via the widening portion of the ridge, and the load is further transmitted to the inner surface of the side sill inner member via the entirety of the surface of the joint flange. This makes it possible to efficiently transmit a side collision load to the side sill inner member. This is advantageous in improving the load transmission performance at the time of a side collision of a vehicle.

As far as the partition member includes at least a partition wall for dividing a closed sectional space in the vehicle front-rear direction, and a joint flange to be joined to a side sill inner member, it is possible to employ a partition member of various shapes. For instance, it is possible to employ a partition member of a C shape, of a plate shape, or of a block shape.

Further, as far as a ridge is capable of increasing the sectional strength, it is possible to employ a ridge of various shapes. For instance, a ridge may be formed by forming a part of a partition wall into a concave shape or a convex shape, or a ridge may be formed by making the thickness of a part of a partition wall larger than the thickness of the remaining part of the partition wall.

In the vehicle body side part structure, preferably, the ridge may be formed to extend generally linearly from a corner portion (lower outer corner portion) of the partition wall on an outer side in the vehicle width direction and on a lower side toward the joint flange.

According to the aforementioned configuration, the ridge is formed along the load input direction at the time of a side collision. Therefore, it is possible to efficiently transmit a load input from the lower outer corner portion of the side sill in an inclined direction inwardly in the vehicle width direction and upwardly (inward and obliquely upper direction) via the ridge.

In the aforementioned configuration, more preferably, the side sill inner member may include an upper wall, and a vertical wall extending downwardly from an inner end of the upper wall in the vehicle width direction. The joint flange may be a flange to be jointed to the upper wall of the side sill inner member. The partition member may include the joint flange, and an additional joint flange to be jointed to the vertical wall of the side sill inner member. The partition wall may include the ridge, and an additional ridge formed to extend generally linearly from an end of the ridge close to the side sill outer reinforcement toward the additional joint flange.

According to the aforementioned configuration, it is possible to efficiently transmit a load from the lower outer corner portion of the side sill outer reinforcement, while distributing the load. Further, the ridge and the additional ridge can resist against bending and torsion by a side collision load in cooperation with each other. This is advantageous in increasing the rigidity of the partition member.

The ridge and the additional ridge can form a ridge of various shapes such as a V shape, an L shape, or a U shape in front view as a whole.

In the aforementioned configuration, more preferably, the vehicle body side part structure may be further provided with a floor cross member extending in the vehicle width direction. The floor cross member may include, at an end thereof, an end flange to be jointed to an upper wall of the side sill inner member. The partition member may be disposed at such a position that at least a part of the widening portion of the ridge and the end flange overlap each other via the upper wall of the side sill inner member.

According to the aforementioned configuration, it is possible to efficiently transmit a side collision load to the floor cross member via, the joint flange and via the end flange that overlaps the joint flange. Further, it is possible to increase the rigidity of the vehicle body by cooperation of the side sill inner member and the floor cross member.

In the vehicle body side part structure, preferably, the partition member may include a first member, and a second member to be independently mounted to a corner portion (lower outer corner portion) of the first member on the outer side in the vehicle width direction and on the lower side. The first member may include the partition wall, an additional partition wall formed away from the partition wall in the vehicle front-rear direction, and a connection wall for connecting between the partition wall and the additional partition wall in the vehicle front-rear direction. The second member may include a main body portion, an opposing lower surface portion formed below the main body portion to face a corner portion of the side sill outer reinforcement on the outer side in the vehicle width direction and on the lower side, and a pair of lateral extensions protruding inwardly in the vehicle width direction from a front end and a rear end of the main body portion, and extending in an inclined direction inwardly in the vehicle width direction and upwardly (inward and obliquely upper direction) when viewed from a vehicle front side. The paired lateral extensions may be respectively jointed to the partition wall and to the additional partition wall of the first member.

According to the aforementioned configuration, the second member is disposed by utilizing the space between the lower outer corner portion of the first member and the lower outer corner portion of the side sill outer reinforcement, and the second member is jointed to the first member. This makes it possible to increase the rigidity of the partition member, while making it easy to mold each of the first member and the second member. Further, the lateral extensions of the second member to be jointed to the partition wall and to the additional partition wall of the first member are formed to extend along the inward and obliquely upper direction when viewed from the vehicle front side. This makes it possible to efficiently transmit a side collision load input from the lower outer corner portion of the side sill in the inward and obliquely upper direction from the second member to the first member.

In the vehicle body side part structure, preferably, the partition member may include the partition wall, an additional partition wall formed away from the partition wall in the vehicle front-rear direction, and a connection wall for connecting between the partition wall and the additional partition wall in the vehicle front-rear direction. Each of the partition wall and the additional partition wall may include an outer perimeter extending in the up-down direction along a vertical wall of the side sill outer reinforcement when viewed from a vehicle front side. The connection wall may include a lateral vertical connection wall for connecting between the outer perimeter of the partition wall and the outer perimeter of the additional partition wall. A vibration attenuation member may be disposed between the lateral vertical connection wall and the vertical wall of the side sill outer reinforcement.

According to the aforementioned configuration, it is possible to improve the performance of suppressing vibrations of a vehicle, or improve the NVH performance by the vibration attenuation member disposed between the lateral vertical connection wall and the side sill outer reinforcement.

In the aforementioned configuration, more preferably, each of the partition wall and the additional partition wall may include an upper outer perimeter extending from an upper end of the outer perimeter in an inclined direction inwardly in the vehicle width direction and upwardly (inward and obliquely upper direction) when viewed from the vehicle front side. The connection wall may include an upper connection wall for connecting between the upper outer perimeter of the partition wall and the upper outer perimeter of the additional partition wall.

According to the aforementioned configuration, it is possible to efficiently transmit a side collision load input from the lower outer corner portion of the side sill to the joint flange via the connection wall (upper connection wall). This makes it possible to smoothly transmit a load in the inward and obliquely upper direction. This is advantageous in improving the load transmission performance at the time of a side collision.

The invention claimed is:
1. A vehicle body side part structure for a vehicle, comprising:

a pillar extending in an up-down direction along a vehicle body side surface;

a side sill connected to a lower part of the pillar and extending in a vehicle front-rear direction; and a partition member provided within the side sill, wherein the side sill includes a side sill outer reinforcement, and a side sill inner member disposed on an inner side of the side sill outer reinforcement in a vehicle width direction, a closed sectional space being formed between the side sill outer reinforcement and the side sill inner member, the partition member includes a first member, and a second member to be independently mounted to a corner portion of the first member on an outer side in the vehicle width direction and on a lower side, the first member includes a partition wall for dividing the closed sectional space of the side sill in the vehicle front-rear direction, an additional partition wall formed away from the partition wall in the vehicle front-rear direction, a connection wall for connecting between the partition wall and the additional partition wall in the vehicle front-rear direction, and a joint flange to be jointed to an inner surface of the side sill inner member, the partition wall includes a ridge extending from a side of the side sill outer reinforcement to a side of the side sill inner member, and connected to the joint flange, the ridge includes a widening portion formed at an end thereof close to the joint flange, the second member includes a main body portion, an opposing lower surface portion formed below the main body portion to face a corner portion of the side sill outer reinforcement on an outer side in the vehicle width direction and on a lower side, and a pair of lateral extensions protruding inwardly in the vehicle width direction from a front end and a rear end of the main body portion, and extending in an inclined direction inwardly in the vehicle width direction and upwardly when viewed from a vehicle front side, and the paired lateral extensions are respectively jointed to the partition wall and to the additional partition wall of the first member.

2. The vehicle body side part structure for a vehicle according to claim 1, wherein the ridge is formed to extend generally linearly from a corner portion of the partition wall on an outer side in the vehicle width direction and on a lower side toward the joint flange.

3. The vehicle body side part structure for a vehicle according to claim 2, wherein the side sill inner member includes an upper wall, and a vertical wall extending downwardly from an inner end of the upper wall in the vehicle width direction, the joint flange is a flange to be jointed to the upper wall of the side sill inner member, the partition member includes the joint flange, and an additional joint flange to be jointed to the vertical wall of the side sill inner member, and the partition wall includes the ridge, and an additional ridge formed to extend generally linearly from an end of the ridge close to the side sill outer reinforcement toward the additional joint flange.

4. The vehicle body side part structure for a vehicle according to claim 2, further comprising a floor cross member extending in the vehicle width direction, wherein the floor cross member includes, at an end thereof, an end flange to be jointed to an upper wall of the side sill inner member, and the partition member is disposed at such a position that at least a part of the widening portion of the ridge and the end flange overlap each other via the upper wall of the side sill inner member.

5. The vehicle body side part structure for a vehicle according to claim 1, wherein each of the partition wall and the additional partition wall includes an outer perimeter extending in the up-down direction along a vertical wall of the side sill outer reinforcement when viewed from a vehicle front side, the connection wall includes a lateral vertical connection wall for connecting between the outer perimeter of the partition wall and the outer perimeter of the additional partition wall, and a vibration attenuation member is disposed between the lateral vertical connection wall and the vertical wall of the side sill outer reinforcement.

6. The vehicle body side part structure for a vehicle according to claim 5, wherein each of the partition wall and the additional partition wall includes an upper outer perimeter extending from an upper end of the outer perimeter in an inclined direction inwardly in the vehicle width direction and upwardly when viewed from the vehicle front side, and the connection wall includes an upper connection wall for connecting between the upper outer perimeter of the partition wall and the upper outer perimeter of the additional partition wall.

* * * * *